Figure 1:
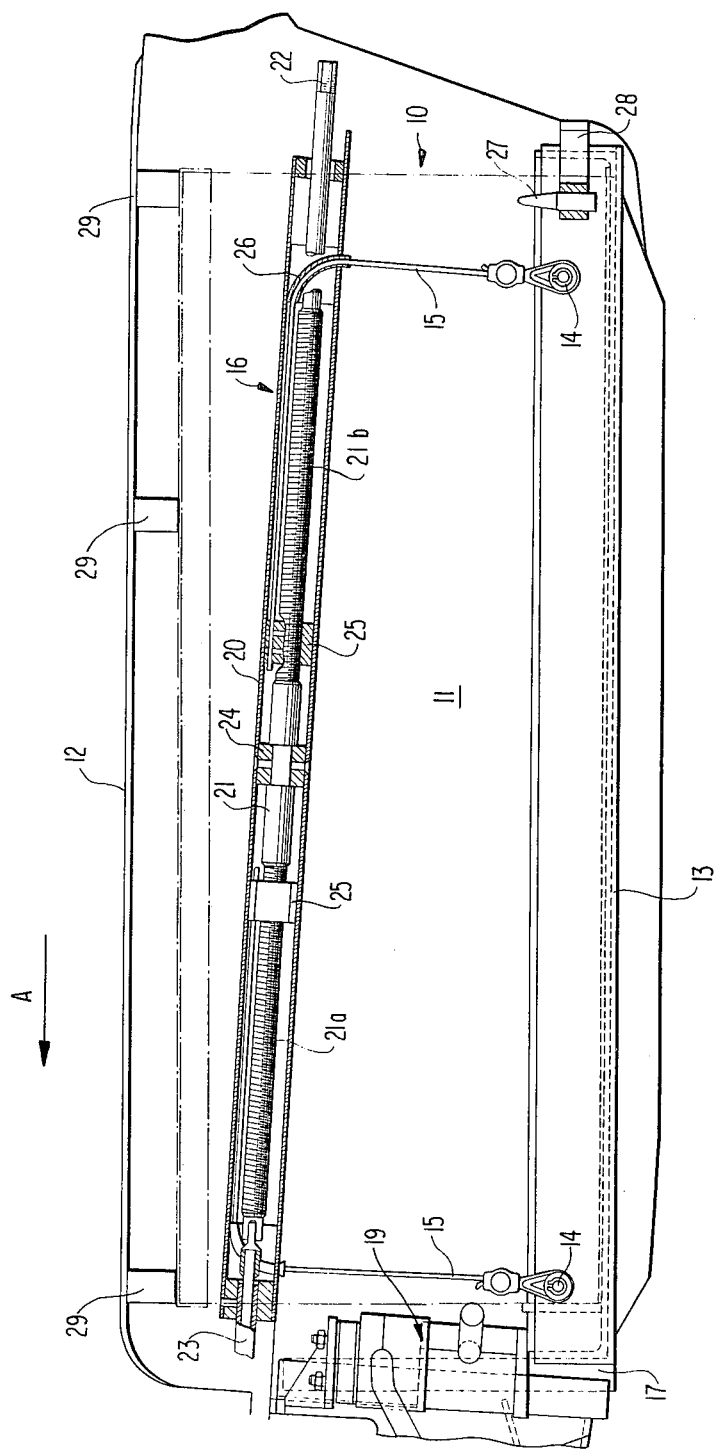

United States Patent [19]

Klink

[11] 4,258,816
[45] Mar. 31, 1981

[54] INSTALLATION FOR THE ACCOMMODATION OF AN INTERCHANGEABLE ENERGY-STORAGE DEVICE IN A MOTOR VEHICLE

[75] Inventor: Rainer Klink, Kernen, Fed. Rep. of Germany

[73] Assignee: Daimler-Benz Aktiengesellschaft, Stuttgart, Fed. Rep. of Germany

[21] Appl. No.: 973,817

[22] Filed: Dec. 28, 1978

[30] Foreign Application Priority Data

Dec. 28, 1977 [DE] Fed. Rep. of Germany ....... 2758534

[51] Int. Cl.³ .................. B62D 25/00; B60R 16/04
[52] U.S. Cl. .................................. 180/68.5; 105/50; 414/462
[58] Field of Search ................ 180/68.5; 187/20; 104/34; 105/50, 51, 426, 432; 414/462, 466, 495, 540; 224/42.44, 42.06, 42.08, 42.21, 42.23; 254/1, 136, 144; 248/544, 610, 612, 669; 108/44, 48, 49, 144, 159

[56] References Cited

U.S. PATENT DOCUMENTS

| 3,003,573 | 10/1961 | Lorenz | 180/68.5 |
| 3,140,111 | 7/1964 | Dabroski | 224/42.23 |
| 3,223,263 | 12/1965 | Fielding | 414/466 |
| 3,477,538 | 11/1969 | Hall et al. | 105/51 X |
| 3,930,552 | 1/1976 | Kunkle et al. | 180/68.5 |
| 3,989,118 | 11/1976 | Hansen | 180/68.5 |
| 4,077,485 | 3/1978 | Bonora et al. | 180/68.5 |
| 4,095,709 | 6/1978 | Eller | 224/42.21 X |

FOREIGN PATENT DOCUMENTS

| 2164072 | 7/1973 | Fed. Rep. of Germany . |
| 2422960 | 11/1975 | Fed. Rep. of Germany . |
| 2558637 | 3/1977 | Fed. Rep. of Germany . |
| 600751 | 11/1925 | France . |

OTHER PUBLICATIONS

Harding, G. G., *Design of Electric Commercial Vehicles for Production*, Society of Automotive Engineers, Mar. 1977.

Primary Examiner—Robert J. Spar
Assistant Examiner—Fred A. Silverberg
Attorney, Agent, or Firm—Craig and Antonelli

[57] ABSTRACT

An installation for the accommodation, insertion and removal of an energy-storage device, preferably, an electric battery, in a motor vehicle which has a special area for accommodating the energy-storage device. Connections are provided in the accommodating area of the vehicle, which connections correspond to the connections on the energy-storage device itself. Conveying and guide arrangements are provided for conveying the energy-storage device into and out of the accommodating area. The energy-storage device rests in a supporting frame provided with corresponding guide elements. The supporting frame is movable into and out of the accommodation area by way of the conveying arrangement in such a manner that the connections of the energy storage device automatically are connected and disconnected with the connections provided on the vehicle.

29 Claims, 2 Drawing Figures

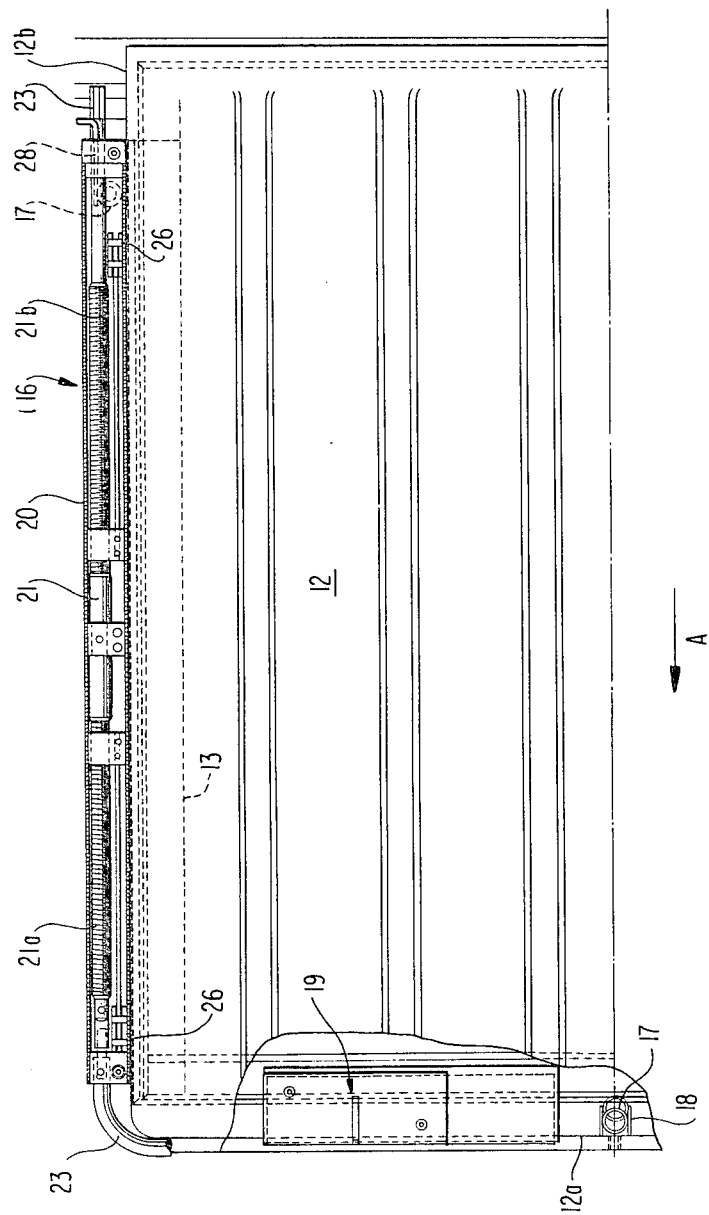

INSTALLATION FOR THE ACCOMMODATION OF AN INTERCHANGEABLE ENERGY-STORAGE DEVICE IN A MOTOR VEHICLE

The present invention relates to a motor vehicle construction and, more particularly, to an installation for the accommodation, insertion and removal of an energy-storage means from a motor vehicle having an area therein for accommodating the storage means, as well as connecting means in the accommodation area, which connecting means correspond to connections normally provided on the energy-storage means.

The present invention is directed primarily, but not exclusively, to a motor vehicle which is adapted to be driven by an electric battery. In such vehicle constructions, the individual battery elements are usually combined to form a large battery block of considerable size and weight.

In the operation of motor vehicles of the aforementioned type, it is necessary to take the heavy storage means out of the vehicle or to place the same into the vehicle again for the purposes of maintainence and exchanging the storage means for another storage means. Due to the relatively heavy weight or relatively large dimensions of the storage-means, a series of difficulties often arise in the insertion and removal of the storage means.

In Offenlegungsschrift Pat. No. 2,558,637, an arrangement is proposed wherein special devices, in the form of exchange parts, are employed to aid in the transferring of the batteries to and from the motor vehicle. A disadvantage of this proposed arrangment resides in the fact that, among other things, it is necessary to position the motor vehicle exactly in a longitudinal direction and at a specific horizontal angular position. Such exact positioning of the vehicle places a great demand on the driving skill of the driver. In this proposed arrangement, a transferable bed plate is provided, which essentially consists of a basic bed plate and a carriage provided in the basic bed plate and bearing latching indentations. The bed plate is guided in a longitudinal direction on the vehicle in, preferably, tracks in the carriage and the basic bed plate is movable at right angles thereto.

In Auslegeschrift Pat. No. 2,422,960, an arrangement for aligning a vehicle in a battery exchange system is proposed which includes a detent means in the driving direction and a lifting apparatus arranged at the battery exchange station for tight adjustment of the batteries.

In accordance with Auslegeschrift Pat. No. 2,164,072 a mounting for a battery tray is constructed and arranged in a motor vehicle in such a manner that the battery tray may be inserted by special means in any position and from any side of the vehicle and, in so doing, it is insured that the tray will enter latched positions.

In each of the above-mentioned proposed devices, the battery is required to be inserted and removed approximately horizontally with respect to the motor vehicle. Consequently, in such proposed constructions, disadvantages reside in the fact that a precise positioning of the motor vehicle is required; tight compensation on the exchange device is necessary; and, the exact positioning and fixing in place of the battery in the vehicle is required.

In SAE Publication No. 770,388, it is proposed to place the battery in the vehicle from below the vehicle. In this proposed arrangement, the vehicle is driven on two bridge-like tracks, the battery is brought into the vehicle by a height lift hoisting cart and is mechanically locked therein. A disadvantage of this proposed construction resides in the fact that to effect insertion and removal of the battery, expensive ancillary devices are required.

As evident from the above discussion, in all of these proposed solutions, the insertion and removal of the batteries can only be effected at a specific location, i.e., at a specially equipped exchanged station.

The aim underlying the present invention essentially resides in providing an installation by which it is possible to exchange, remove or replace a vehicle energy-storage means such as a storage battery for the purpose of renovation or maintenance, which installation is independent of any specific location or positioning of the vehicle.

According to advantageous features of the present invention, conveying and guide means associated with the motor vehicle are arranged at and accommodation area for the energy-storage means, with the storage means resting in a supporting frame having corresponding guide elements, and with the supporting frame being movable into and out of the accommodation area by way of the conveying means in such a manner that the connections of the storage means automatically latch and unlatch into connecting means arranged at a side of the vehicle.

The load on or the relief of the load on a spring system of the vehicle, due to the presence of a heavy battery or another storage means, results in a more or less severe inward or outward spring deflection which causes a corresponding increasing or decreasing tilting motion of the vehicle usually in the eccentric position of the battery with respect to a center of gravity of the vehicle. In accordance with further advantageous features of the present invention, the conveying means are arranged and constructed in such a way that a relative motion of the vehicle with respect to the ground or road surface, which motion occurs during a removal or insertion of the storage means, may be automatically compensated.

While according to the general principles of the present invention, the energy-storage means may also be horizontally inserted or slid out with the proposed conveying device associated with the vehicle, it is primarily intended to construct the installation so that the accommodation area is closed off toward the vehicle interior and open from below, so that the storage means can be raised or lowered by means of a lifting apparatus into and out of the accommodation area, and, in the raised position, the supporting frame is located approximately at the height of a floor of the vehicle. For example, the supporting frame is assumed to be located somewhat lower than the floor of the transport vehicle. The accommodation are preferably is located in the rear of the vehicle and extends essentially in a longitudinal direction. Of course, it is also possible, in accordance with the present invention, to arrange the accommodation area longitudinally between the axles or at right angles to the axles of the vehicle.

According to additional advantageous features of the present invention, the supporting frame may have a U-shaped construction, with an open side of the supporting frame facing an exterior side of the vehicle. Four supporting cable means may be provided in the general area of the four corners of the supporting frame with the cable means being operatively connected to the lifting apparatus associated with the accommodation area.

Moreover, the lifting apparatus in accordance with the present invention may include two threaded spindles each of which is provided with left and right handed threaded sections. The threaded spindles may be disposed horizontally on two opposite sides of the accommodation area and may be adapted to be rotated together with at least one nut being associated with each threaded section of the respective threaded spindles. Each nut is arranged such that it cannot rotate, but rather is displaced longitudinally on the spindle. The respective cable means are secured to the respective nuts provided on the threaded spindles, such that a displacement of the nuts results in the movement of the cables so as to raise or lower the supporting frame.

The guide means for the cable means may be constructed as guide grommets; however, it is also possible in accordance with the present invention to form the guides of a flat offset cylindrical segment, or provide one or to more limit pins or lag screws.

To avoid providing any additional mechanical securing means for the battery or battery mount, in accordance with an additional advantageous feature of the present invention, the threads of the threaded spindles are self locking, whereby the battery is secured with respect to the vehicle without the provision of additional fasteners or securing devices.

Moreover, by virtue of the provision of the threaded spindles, a simple rotary motion, which can be carried out manually, mechanically, pneumatically or electrically by way of a power driven screwdriver or the like, reduces to a minimum the number of working steps required for the lifting, lowering and the mechanical guidance of the battery or energy-storage means within the vehicle.

In order to provide for uniform rising or lowering of the vehicle on its associated spring system, the accommodation area should preferably be located directly below the center of gravity of the vehicle, so that during a lowering or raising of the energy-storage means, uniform motion is achieved. However, only occasionally is the location of the accommodation area directly below the center of gravity of the vehicle, and, generally, an arrangement outside the center of gravity of the vehicle is assumed to be more common with the energy-storage means being provided at, for example, the rear of the vehicle. With the location of the accommodation area at the vehicle rear during a lowering and raising of the energy-storage means, the vehicle tilts on its spring system. To compensate for the tilting motion, according to the present invention, a pair of the four threaded sections provided on the two spindles have a different pitch.

The direction of tilting motion determines which individual threaded sections, in pairs, have the same pitches. For example, if the accommodation area is located along the longitudinal axis of the vehicle in the rear with longitudinally arranged threaded spindles, than the two forward thread sections on the two spindles are mutually equal in length and pitch and differ from the rear threaded section which are, in turn, mutually equal in length and pitch. However, if, for example, the accommodation area is located along the longitudinal axis of the vehicle in the rear with threaded spindles extending at right angles to the longitudinal axis, then the threaded sections on the forward spindle are mutually equal and differ from the two threaded sections located on the rear spindle.

In accordance with further features of the present invention, each of the threaded spindles are arranged in a housing constructed as, for example, a square pipe with the nuts being of a square construction, so as to secure them against rotation but permit their axial displacement relative to the spindles as the spindles are rotated.

Additionally, at least one of the ends of the spindle facing toward the vehicle exterior may be provided with a crank connection, with the other end of that spindle and an adjacent end of the other spindle located at the interior of the vehicle being mutually connected for rotation by, for example, a flexible shaft or the like. As readily apparent, instead of a flexible shaft, a transmission with a transverse shaft and with double gears and/or with a chain drive may also be utilized.

Additionally, resilient buffer means may be arranged in the accommodation area with the buffer means functioning as stops for the storage means when the storage means is in a final inserted position.

To relieve the strain on the lifting apparatus when the storage means is inserted into the vehicle, according to the present invention, means are provided for support in the supporting frame in the inserted position.

To expedite the interconnection of the energy-storage means with connecting means associated with the vehicle, preferably the connecting means on the storage means are arranged on a side corresponding to a closed side of the supporting frame, with the connecting means of the storage battery being adapted to be connected to the connecting means of the vehicle when the energy storage means is inserted.

The storage means and the supporting frame may be guided, in accordance with the present invention, by fixing the supporting frame in place or guiding the supporting frame with special guides with respect to the accommodation area, with the storage means being fixed in place or guided by special guides with respect to the supporting frame.

The guide means according to the present invention may include a guide tube which corresponds approximately to the lifting height arranged on the supporting frame and located approximately in a middle area of the U-shaped supporting frame between the connecting means provided for the storage means. The guide tube may extend into the U-shaped tracks provided on a wall of the accommodation area with the U-shaped tracks conforming to the U-shape of the supporting frame. Two guide tubes may be arranged on the right and left hand side of the accommodation area, so as to facilitate a rough introduction of the storage means from the removed position to an inserted position. However, a precise insertion of the connecting means is possible if conical guide pins are arranged on the supporting frame with the guide pins being of a somewhat greater length than the corresponding engagement distance of the connecting means. The guide pins may extend into corresponding eyes or openings on a wall of the accommodation area and, optionally, at the same time, also into corresponding eyes or openings provided on the energy-storage means.

By virtue of the above noted guide means of the present invention, a faulty contact between the storage means, constructed as, for example, an electric battery, and the motor vehicle is eliminated. Moreover, the storage means may also be fixed in position solely with a kind of knob or protrusion accommodated in holes of the supporting frame or vice versa, which is advantageous in that only a slight lifting action of the knob or projection need be made during a separation of the storage means and the supporting frame.

Additionally, according to the present invention, it is possible to provide the actual storage means support with rollers of a smaller diameter along a bottom portion thereof, so that the support may be removed from the supporting frame after the storage means has been lowered. In this connection, the direction of rotation of the rollers is preferably parallel to the legs of the U-shaped supporting frame. However, pivotal rollers may also be used.

Accordingly, it is an object of the present invention to provide an installation for the accommodation, insertion and removal of an energy-storage means which avoids, by simple means, shortcomings and disadvantages encountered in the prior art.

Another object of the present invention resides in providing an installation for the accommodation, insertion and removal of an energy-storage means which is simple in construction and therefore relatively inexpensive to manufacture.

Yet another object of the present invention resides in providing an installation for the accommodation, insertion and removal of an energy-storage means of a vehicle which does not require a precise positioning of the vehicle, nor an exact positioning and fixing of the energy storage means in place.

A further object of the present invention resides in providing an installation for the accommodation, insertion and removal of an energy-storage means from a vehicle, whereby the energy-storage means can be exchanged or serviced completely independently of any special exchange stations by one individual without requiring elaborate, expensive ancillary devices.

A still further object of the present invention resides in providing an installation for the accommodation, insertion and removal of an energy-storage means from a vehicle which automatically compensates for any relative motion of the vehicle with respect to the road surface during a removal or insertion of the energy-storage means.

These and other objects, features and advantages of the present invention will become more apparent from the following description when taken in connection with the accompanying drawings, which show, for the purposes of illustration only, one embodiment in accordance with the present invention, and wherein:

FIG. 1 is a partial cross-sectional view of an energy-storage means accommodation area disposed in a rear of a motor vehicle with a lifting apparatus disposed in the accommodation area; and FIG. 2 is a top view of the accommodation area of FIG. 1.

Referring to the drawings wherein like reference numerals are used throughout the various views to designate like parts and, more particularly, to FIG. 1, an accommodation area generally designated by the reference numeral 10 is provided for accommodating an energy-storage means such as, for example, a schematically illustrated battery 11. The accommodation area 10 is provided at a rear of a motor vehicle (not shown) and is shielded from an interior of the motor vehicle by an upwardly curved wall 12. The accommodation area 10 has a predetermined height such that, when the battery 11 is inserted in the accommodation area 10, the battery is located at a desired distance from the ground or the road surface. The accommodation area 10 is also located at an inclined position in order to prevent a scraping of the rear of the motor vehicle on the ground or road surface when the vehicle moves across tracks or ruts in a roadbed.

The battery 11, which may be conventially formed from a plurality of individual elements in a total block, is adapted to rest upon a U-shaped supporting frame 13 with the legs of the U-shaped supporting frame extending or pointing toward a rear of the vehicle in a direction opposite the driving direction indicated by the arrow A. The supporting frame 13 is welded together from a plurality of, for example, angle irons, which are suitably reinforced. Supporting frame bosses 14 are arranged on both sides of the supporting frame 13 at the forward and rearward portions thereof. Cable pulleys 15 of a lifting apparatus generally designated by the reference numeral 16, described more fully hereinafter, are suspended at the supporting frame bosses 14.

A guide tube 17 is welded to a forward end of the supporting frame 13 in the middle area thereof. As shown most clearly in FIG. 2, the guide tube 17 extends into a U-shaped track 18 arranged on a forward wall 12a of the accommodation area 10. The length of the guide tube 17 corresponds approximately to a total lifting height of the lifting apparatus 16. The U-shaped tracks 18, as with the supporting frame 13, are open toward a rear of the vehicle; however, a lower third of the U-shaped track 18 is covered in order to prevent a removed supporting frame 13 from swinging.

Connecting means generally designated by the reference numeral 19 are disposed on both sides of the guide tubes 17 and U-shaped track 18. The connecting means 19 may be constructed as, for example, a plug socket provided on the battery 11 and a plug component arranged in the accommodation area 10 of the vehicle. The plug and socket construction of the connecting means 19 may be of conventional construction and, consequently, need not be described more fully herein. Moreover, the at least one plug component may be elastically suspended or fastened in order to be able to compensate for relatively small movements between the battery 11 and the supporting elements in the accommodation area 10. In the illustrated embodiment, the plugs are, for example, arranged in the vehicle with the plugs being mounted by way of elastic or rubber elements.

The lifting apparatus 16 includes a square pipe 20 provided on each of the two sides of the lateral wall 12b of the accommodation area 10. Each of the square pipes 20 has accommodated therein a threaded spindle 21. At least one of the threaded spindles 11 has, at a rear end thereof, a hexagonal configuration 22 and is adapted to receive a manually or power operated crank or power driven screwdriver. The threaded spindles 21 are interconnected at their forward end by a transmission means 23 such as a flexible shaft so that both spindles can only rotate together.

A block 24 is disposed in approximately the middle area of each of the two threaded spindles 21 for holding the spindles 21 in position inside of the square pipe 20 in such a way that the spindles 21 are axially fixed but rotatable relative to the associated square pipe 20. A threaded section 21a, 21b is provided on each of the threaded spindles 21 with the threaded sections 21a, 21b each being constructed respectively as right and left hand threads. The threaded sections extend on each of the two sides of the block 24. Nuts 25 are disposed on the outside of the threaded sections 21a, 21b so as to rotate thereon. The nuts 25 have a square contour or configuration and, consequently, cannot rotate in the respective square pipe 20 of the lifting apparatus 16. Thus, when the threaded spindles 21 are rotated, the nuts 25 move in a longitudinal direction. More particularly, upon a rotation of the threaded spindles 21 in one direction of rotation, the threaded section 21a rotates forwardly and the threaded section 21b rotates rearwardly. Upon rotation of the threaded spindle 21 in the other direction of rotation, both nuts 25 are displaced toward the middle position illustrated in the drawings.

The ends of each of the respective four cable pulleys 15 contact or engage a supporting boss 14 which is provided generally in the area of the four corners of the supporting frame 13. The other ends of the respective cable pulleys 15 are held in the respective nuts 25 and are conveyed or guided through guide grommets 26 disposed adjacent to the ends of the respective threaded sections 21a, 21b of the threaded spindles 21. In lieu of grommets 26, the guide means may be formed as, for example, a flat, offset cylinder segment and one or more limit pins or lag screws.

If the threaded spindles 21 are rotated from the position shown in FIG. 1, then the nuts 25 on both spindles 21 will travel forwardly or rearwardly, respectively, and the supporting frame 13 including the battery 11 is raised so as to be received in the accommodation area 10. In this connection, the guide tube 17 serves as an aid in the approximate fixing in place of the supporting frame 13 with respect to the vehicle. Guide pins 27 are provided at the end of the legs of the U-shaped supporting frame 13. The guide pins 27 extend into corresponding openings or eyes 28 provided on the vehicle. The engagement of the respective pins 27 and corresponding openings or eyes 28 occurs shortly prior to the connecting means 19 contacting each other. In this manner, a safe contact is assured. The elastic shoulders 29 are provided on the upper wall 12 of the accommodation area 10 against which shoulders the battery 11 makes contact when the battery 11 is in an uppermost position. The threaded spindles 21 have a self locking construction so that an unintentional releasing of the lifting apparatus 16 or battery 11 from the uppermost position is excluded.

While I have shown and described only one embodiment in accordance with the present invention, it is understood the same is not limited thereto, but is suspectible of numerous changes and modifications as known to one having ordinary skill in the art, and I therefore do not wish to be limited to the details shown and described herein, but intend to cover all such modifications as are encompassed by the scope of the appended claims.

I claim:

1. An installation for insertion and removal of an energy-storage means in a motor vehicle, the motor vehicle including an area for accommodating th energy-storage means, characterized in that means are provided for conveying and guiding the energy-storage means into and out of the accommodating area, said conveying and guiding means including a lifting and lowering means utilizing a plurality of lifting cable means and a pair of threaded spindle means for lifting and lowering said energy-storage means, said threaded spindle means being adapted to effect an uneven movement of said plurality of lifting cable means so as to compensate for the tilting of said motor vehicle during an insertion or removal of said energy-storage means, whereby said energy-storage means is maintained in a substantially level position during the tilting of said motor vehicle, frame means are provided for supporting the energy-storage means, said supporting frame means being operatively connected with said lifting and lowering means of said conveying and guiding means so as to be movable thereby into and out of the accommodating area, and in that means are provided for automatically connecting or disconnecting the energy-storage means from a connecting means provided at the vehicle upon an insertion and removal of the energy-storage means from the accommodating area.

2. An installation according to claim 1, characterized in that said automatic connecting and disconnecting means includes guide means provided on said supporting frame means cooperable with the guiding means of the conveying and guiding means.

3. An installation according to claim 1, characterized in that the energy storage means is an electric battery.

4. An installation according to claim 1, characterized in that means are provided for closing the accommodating area from an interior of the vehicle, the accommodating area is open from below so as to permit the energy-storage means to be raised or lowered into and out of the accommodating area, and in that the lifting and lowering means is operatively connected with the supporting frame means, said lifting and lowering means is adapted to raise the energy-storage means so that the energy-storage means is located approximately at a height of a floor of the motor vehicle when the energy-storage means is in a raised position.

5. An installation according to claim 4, characterized in that the supporting frame means have a substantially U-shaped configuration opening in a direction toward an exterior side of the motor vehicle.

6. An installation according to claim 5, characterized in that said plurality of cable means operatively connect the supporting frame means to the lifting and lowering means, the cable means being adapted to be connected to the supporting frame means substantially in an area of corners thereof.

7. An installation according to claim 1, characterized in that the supporting frame means has a substantially U-shaped configuration opening in a direction toward an exterior of the motor vehicle.

8. An installation according to claim 7, characterized in that the plurality of cable means operatively connect the supporting frame means to the lifting and lowering means.

9. An installation according to claim 1, characterized in that resilient buffer means are arranged in the accommodating area for stopping the energy-storage means in a final inserted position.

10. An installation according to claim 1, characterized in that means are provided for supporting the supporting frame means in an inserted position.

11. An installation according to claim 10, characterized in that conical guide pin means are provided on the supporting frame means for insuring a safe contact of the connecting means of the energy-storage means with the connecting means provided at the motor vehicle, the guide pin means having a length corresponding approximately to an engagement distance between the respective connecting means.

12. An installation according to claim 1, characterized in that the guide means of the conveying and guiding means include a guide tube arranged in a middle area of the supporting frame means and U-shaped guide track means provided on a wall-member of the accommodating area for receiving the guide tube means.

13. An installation for insertion and removal of an energy-storage means in a motor vehicle, the motor vehicle including an area for accommodating the energy-storage means, characterized in that means are provided for conveying and guiding the energy-storage means into and out of the accommodating area, frame means are provided for supporting the energy-storage means, said supporting frame means being operatively connected with said conveying and guiding means so as to be movable thereby into and out of the accommodating area, means are provided for automatically connecting or disconnecting the energy-storage means from a connecting means provided at the vehicle upon an insertion and removal of the energy-storage means from the accommodating area, means are provided for closing the accommodating area from an interior of the vehicle, the accommodating area is open from below so as to permit the energy-storage means to be raised or lowered into and out of the accommodating area, the guiding and conveying means includes a lifting and lowering means operatively connected with the supporting frame means, said lifting and lowering means is adapted to raise the energy-storage means so that the energy-storage means is located approximately at a height of a floor of the motor vehicle when the energy-storage means is in a raised position, the supporting frame means have a substantially U-shaped configuration opening in a direction toward an exterior side of the motor vehicle, a plurality of cable means are provided for operatively connecting the supporting frame means to the lifting and lowering means, the cable means being adapted to be connected to the supporting frame means substantially in an area of corners thereof, the lifting and lowering means includes a pair of threaded spindle means extending horizontally and being disposed at opposed sides of the accommodating area, each of said threaded spindle means including two threaded sections, means are provided for causing said pair of threaded spindle means to rotate in unison, means are provided for securing the respective cable means to one of the threaded sections of the threaded spindle means, said securing means being adapted to be axially but not rotatably displaceable relative to an associated threaded section of the threaded spindle means, and in that means are provided for guiding the respective cable means from the supporting frame means to an associated securing means.

14. An installation according to claim 13, characterized in that the cable means guiding means includes a guide casing provided at respective ends of the respective threaded spindle means.

15. An installation according to claim 14, characterized in that the two threaded sections on each of the pair of threaded spindle means have a different pitch from each other.

16. An installation according to claim 15, characterized in that the lifting and loading means further includes a pair of rectangular pipe means for accommodating a respective one of the threaded spindle means in an axially fixed manner, and in that the securing means includes a nut means having a rectangular configuration corresponding to the configuration of the pipe means so as to secure the respective nut means against rotation.

17. An installation according to claim 16, characterized in that a crank connection is provided on at least one end of at least one of the threaded spindle means, the at least one end facing toward an exterior of the vehicle, and in that said means for causing said pair of threaded spindle means to rotate in unison includes a flexible shaft means for mutually connecting ends of the threaded spindle means located at an interior of the motor vehicle.

18. An installation according to claim 17, characterized in that resilient buffer means are arranged in the accommodating area for stopping the energy storage means in a final inserted position.

19. An installation according to claim 18, characterized in that means are provided for supporting the supporting means in an inserted position.

20. An installation according to claim 19, characterized in that the guide means of the conveying and guiding means includes at least one guide tube arranged in a middle area of the supporting frame means, said guide tube having a height corresponding at least approximately to a lifting height of the lifting and lowering means, and U-shaped guide track means provided on a wall member of the accommodating area for receiving the guide track means, said U-shaped guide track means having a configuration conforming to the U-shape of the supporting frame means.

21. An installation according to claim 20, characterized in that conical guide pin means are provided on the supporting frame means for insuring a safe contact of the connecting means of the energy-storage means with the connecting means provided at the motor vehicle, the guide pin means having a length corresponding approximately to an engagement distance between the connecting means.

22. An installation according to claim 21, characterized in that openings are provided on a wall member of the accommodating area for receiving said guide pin means.

23. An installation according to claim 22, characterized in that openings are provided in the energy-storage means for accommodating the guide pin means.

24. An installation for insertion and removal of an energy-storage means in a motor vehicle, the motor vehicle including an area for accommodating the energy-storage means, characterized in that means are provided for conveying and guiding the energy-storage means into and out of the accommodating area, frame means are provided for supporting the energy-storage means, said supporting frame means being operatively connected with said conveying and guiding means so as to be movable thereby into and out of the accommodating area, means are provided for automatically connecting or disconnecting the energy-storage means from a connecting means provided at the vehicle upon an insertion and removal of the energy-storage means from the accommodating area, the guiding and conveying means includes a lifting and lowering means operatively connected with the supporting frame means, the lifting and lowering means including a pair of threaded spindle means extending horizontally and being disposed at opposed sides of the accommodating area, each of the threaded spindle means including two threaded sections, means are provided for causing said pair of threaded spindle means to rotate in unison, and in that means are provided for operatively connecting each of the threaded sections to a portion of the supporting frame means including nut means arranged on each of the threaded sections adapted to be axially but nonrotatably displaceable relative to an associated threaded section of the threaded spindle means so as to permit a raising and lowering of the supporting frame means.

25. An installation according to claim 24, characterized in that the two threaded sections on each of the pair of threaded spindle means have a different pitch from each other.

26. An installation according to claim 25, characterized in that the lifting and lowering means further includes a rectangular pipe means for accommodating a respective threaded spindle means in an axially fixed manner, and in that the nut means have a rectangular configuration corresponding to the configuration of the pipe means so as to secure the respective nut means against rotation.

27. An installation for an insertion or a removal of an energy-storage means of a motor vehicle, the motor vehicle including an area for accommodating the energy-storage means, characterized in that supporting frame means are provided for supporting the energy-storage means, means are provided for fixing one of the supporting frame means relative to the accommodating area and the energy-storage means relative to the supporting frame means, means are provided for guiding the other said supporting frame means relative to the accommodating area and the energy-storage means relative to the supporting frame means, and in that means are provided for lifting at least one of the supporting frame means and the energy-storage means into the accommodating area, said lifting means including a plurality of lifting cable means and a pair of threaded spindle means for lifting and lowering said energy-storage means, said threaded spindle means being adapted to effect an uneven movement of said plurality of lifting cable means, so as to compensate for the tilting of said motor vehicle during an insertion or removal of said energy-storage means, whereby said energy-storage means is maintained in a substantially level position during the tilting of said motor vehicle.

28. An installation according to claim 27, characterized in that the guiding means includes at least one guide tube means arranged on the supporting frame means, the guide tube means having a height corresponding at least approximately to a lifting means, and the U-shaped guide track means provided on a wall member of the accommodating area for receiving the guide tube means.

29. An installation according to one of claims 27 or 28, characterized in that conical guide pin means are provided on the supporting frame means for insuring a safe contact of connecting means of the energy-storage means with connecting means provided at the motor vehicle, the guide pin means having a length corresponding approximately to an engagement distance between the respective connecting means.

* * * * *